United States Patent
Choi

(10) Patent No.: US 8,892,098 B2
(45) Date of Patent: Nov. 18, 2014

(54) COMMUNICATION APPARATUS AND METHOD FOR DUAL-MODE MOBILE TERMINAL

(75) Inventor: Jong Mu Choi, Gunpo-si (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 1673 days.

(21) Appl. No.: 11/952,163

(22) Filed: Dec. 7, 2007

(65) Prior Publication Data

US 2008/0248799 A1    Oct. 9, 2008

(30) Foreign Application Priority Data

Apr. 9, 2007    (KR) ..................... 10-2007-0034623

(51) Int. Cl.
  H04W 36/00    (2009.01)
  H04W 4/00    (2009.01)
  H04W 4/12    (2009.01)
  H04M 1/00    (2006.01)
  H04W 76/02    (2009.01)
  H04W 88/06    (2009.01)
  H04W 74/08    (2009.01)

(52) U.S. Cl.
  CPC ............ H04W 76/025 (2013.01); H04W 88/06 (2013.01); H04W 74/0866 (2013.01); H04W 74/085 (2013.01)
  USPC ..................... 455/436; 455/426.1; 455/552.1; 455/553.1; 455/466; 370/331

(58) Field of Classification Search
  CPC . H04W 84/12; H04W 36/14; H04W 72/0406; H04W 74/04; H04W 92/18; H04W 36/0005; H04W 36/0022; H04W 36/0061; H04W 36/08; H04W 36/36; H04W 80/10; H04W 92/02; H04L 65/1006; H04L 12/4625; H04L 69/08; H04M 1/2535; H04M 3/42374; H04M 7/006
  USPC .......... 370/351, 352, 466, 331–334; 455/466, 455/436–444
  See application file for complete search history.

(56) References Cited

U.S. PATENT DOCUMENTS 7,050,424 B2 * 5/2006 Cheng et al. ................... 370/352
7,158,625 B2 * 1/2007 Casaccia ................... 379/207.02

(Continued)

FOREIGN PATENT DOCUMENTS

KR    2004-51315    6/2004    ............... H04B 7/26
KR    2004-51909    6/2004    ............... H04Q 7/38

(Continued)

OTHER PUBLICATIONS

So, Jungmin; et al.; "Multi-Channel MAC for Ad Hoc Networks: Handling Multi-Channel Hidden Terminals Using a Single Transceiver;" Proceedings of 5$^{th}$ ACM International Symposium on MOBIHOC; May 24, 2004; XP007905658.

(Continued)

Primary Examiner — Matthew Sams
(74) Attorney, Agent, or Firm — Cha & Reiter, LLC

(57) ABSTRACT

A communication apparatus and method for a dual-mode mobile terminal provides supporting communications through a wireless local area network and a cellular network, simultaneously. The communication apparatus includes a first communication unit for supporting a wireless local area network communication; a second communication unit for supporting a cellular communication; and a control unit for controlling the second communication unit to set up a media session with another terminal and for controlling the first communication unit to retrieve a preferred channel among a plurality of channels provided by an Access Point.

20 Claims, 6 Drawing Sheets

(56) References Cited

U.S. PATENT DOCUMENTS

| | | | |
|---|---|---|---|
| 7,277,719 B2 * | 10/2007 | Klassen et al. | 455/466 |
| 7,657,262 B2 * | 2/2010 | Grayson | 455/444 |
| 8,077,683 B2 * | 12/2011 | Rudolf et al. | 370/338 |
| 8,190,155 B2 * | 5/2012 | Roy et al. | 455/435.2 |
| 2004/0264410 A1 * | 12/2004 | Sagi et al. | 370/331 |
| 2005/0141480 A1 * | 6/2005 | Jin et al. | 370/351 |
| 2005/0266845 A1 * | 12/2005 | Aerrabotu et al. | 455/436 |
| 2006/0056448 A1 * | 3/2006 | Zaki et al. | 370/466 |
| 2006/0101098 A1 * | 5/2006 | Morgan et al. | 707/204 |
| 2006/0155814 A1 * | 7/2006 | Bennett et al. | 709/207 |
| 2006/0246903 A1 * | 11/2006 | Kong et al. | 455/437 |
| 2006/0258358 A1 | 11/2006 | Kallio | |
| 2006/0270411 A1 * | 11/2006 | Grayson | 455/444 |
| 2007/0076664 A1 * | 4/2007 | An et al. | 370/331 |
| 2007/0213078 A1 * | 9/2007 | Shaheen | 455/466 |
| 2008/0043669 A1 * | 2/2008 | Gallagher et al. | 370/329 |

FOREIGN PATENT DOCUMENTS

| | | | |
|---|---|---|---|
| KR | 2005-61250 | 6/2005 | H04L 12/28 |
| KR | 2006-65569 | 6/2006 | H04L 12/66 |

OTHER PUBLICATIONS

Jain, Nitin; et al.; "A Multichannel CSMA MAC Protocol With Receiver-Based Channel Selection For Multihop Wireless Networks;" Proceedings of $10^{th}$ International Conference on Computer Communications and Networks; Oct. 17, 2001; XP 010562128.

Bahl, Paramvir; et al.; "Reconsidering Wireless Systems With Multiple Radios;" ACM SIGCOMM Computer Communications Review; Oct. 5, 2004; XP001223378.

* cited by examiner

COMMUNICATION APPARATUS AND METHOD FOR DUAL-MODE MOBILE TERMINAL

CLAIM OF PRIORITY

This application claims priority under 35 U.S.C. §119 from an application entitled "COMMUNICATION APPARATUS AND METHOD FOR DUAL MODE MOBILE TERMINAL," filed in the Korean Intellectual Property Office on Apr. 9, 2007 and assigned Serial No. 2007-0034623, the contents of which are incorporated herein by reference in its entirety.

BACKGROUND OF THE INVENTION

1. Field of the Invention

The present invention relates to a communication apparatus and method that can be used in a mobile terminal. More particularly, the present invention relates to a communication apparatus and method for a dual-mode mobile terminal having a wireless local area network (WLAN) interface and a cellular network interface.

2. Description of the Related Art

Recently, various types of wireless communication networks have been deployed, some of which can be classified into either a cellular network or a WLAN. The most recently-deployed cellular communication networks are typically based on one of Code Division Multiple Access 2000 1x Evolution Data Optimized (CDMA2000 1xEVDO), General Packet Radio Services (GPRS), or Universal Mobile Telecommunication Service (UMTS), Global System for Mobile communication (GSM). The Institute of Electrical and Electronics Engineers (IEEE) 802.11 standards typically govern operation of the typical WLANs.

With the deployment of various communication networks, various wireless local area network access technologies based on the IEEE 802.11x standards have been introduced. The WLAN may serve as a cable replacement of the conventional cable modem and Digital Subscriber Line (xDSL) networks for hot spots and homes without compromising the data rate.

The IEEE 802.11 standards use a media access control (MAC) protocol referred to as Carrier Sensing Multiple Access with Collision Avoidance (CSMA/CA).

FIGS. 1A to 1C are schematic diagrams illustrating CSMA/CA based wireless communication.

Referring to FIG. 1A, there are four mobile terminals 1, 2, 3 and 4. The first terminal 1 is located within a radio coverage area of the second terminal 2, and the fourth mobile terminal 4 is located within a radio coverage area of the third terminal 3. Thus there is overlapping coverage areas for multiple terminals.

In order to avoid collision while the second mobile terminal 2 communicates with the third mobile terminal 3, the first and fourth mobile terminals 1 and 4 are restricted from using the same channel as terminals 2 and 3. Such collision avoidance can be achieved with the CSMA/CA mechanism.

Referring to FIG. 1B, the second mobile terminal 2 scans radio channels in search of an available channel. If an available channel is found, the second mobile terminal 2 sends a Request To Send (RTS) frame. The RTS frame is received by the mobile terminals located in the radio range of the second mobile terminal 2, i.e. the first and third mobile terminals 1 and 3. The RTS frame carries information about the destination terminal (the third mobile terminal 3) and the data transmission time period indicated by the a Network Allocation Vector (NAV). Upon receiving the RTS frame, the first mobile terminal 1, which is not the destination terminal, stops using the channel during the period indicated by the NAV value, such that the second terminal 2 can send the data to the third mobile terminal 3 without incurring a data collision with the first mobile terminal 1.

Referring to FIG. 1C, the third mobile terminal 3 sends a Confirm To Send (CTS) frame in response to receiving the RTS frame from mobile terminal 2. However, due to the fact that the second and fourth mobile terminals 2 and 4 are located within the radio coverage area of the third mobile terminal 3, the second and fourth mobile terminals 2 and 4 both respectively receive the CTS frame. The CTS frame carries information identifying the destination is the second mobile terminal 2 and a NAV value. Accordingly, the fourth mobile terminal 4 stops transmitting data (i.e. is blocked) during the period indicated by the NAV value such that the second and third mobile terminals 2 and 3 can communicate without interferences/collisions by transmissions from other terminals.

As described above, in the CSMA/CA based WLAN, the terminals can communicate with each other without having a data collision by securing a competition free period by exchanging the RTS/CTS frames with the terminals located in the radio ranges of the terminals involved in the communication.

However, the conventional WLAN communication system has a drawback in that other terminals that are part of a current communication cannot communicate with other terminals since all the terminals use the same communication channel. Accordingly, as the number of the terminals increases in the network especially at a hot spot, the network throughput becomes significantly degraded as the total number of competition free periods are limited may cause terminals to delay transmission that results in communication failures.

SUMMARY OF THE INVENTION

The present invention has been made in part in an effort to solve at least some of the above problems and provides some of the advantages described herein below. Accordingly, the present invention provides a communication apparatus and method for improving a network throughput by utilizing multiple communication channels.

Also, the present invention provides a communication apparatus and method for a dual-mode mobile terminal that provides for effective resource management by establishing a session through a cellular network and retrieving a most available channel among the channels provided by an IP network, simultaneously.

In accordance with an exemplary aspect of the present invention, the above and other objects are accomplishes by a communication apparatus for dual-mode mobile terminal. The communication apparatus includes a first communication unit for supporting a wireless local area network communication; a second communication unit for supporting a cellular communication; and a control unit for controlling the second communication unit in order to set up a media session with another terminal and for controlling the first communication unit to retrieve a preferred channel among a plurality of channels provided by an Access Point.

In accordance with another exemplary aspect of the present invention, the above and other objects are accomplished by a communication method for a dual-mode mobile terminal. The communication method typically includes establishing a media session with another terminal through a cellular network; retrieving one of channels provided by an Access Point of an Internet protocol network as a preferred channel; and communicating with the terminal through the preferred channel after the media session is established.

BRIEF DESCRIPTION OF THE DRAWINGS

The above features and advantages of the present invention will be more apparent from the following detailed description in conjunction with the accompanying drawings, in which.

DETAILED DESCRIPTION

Figure 1A:
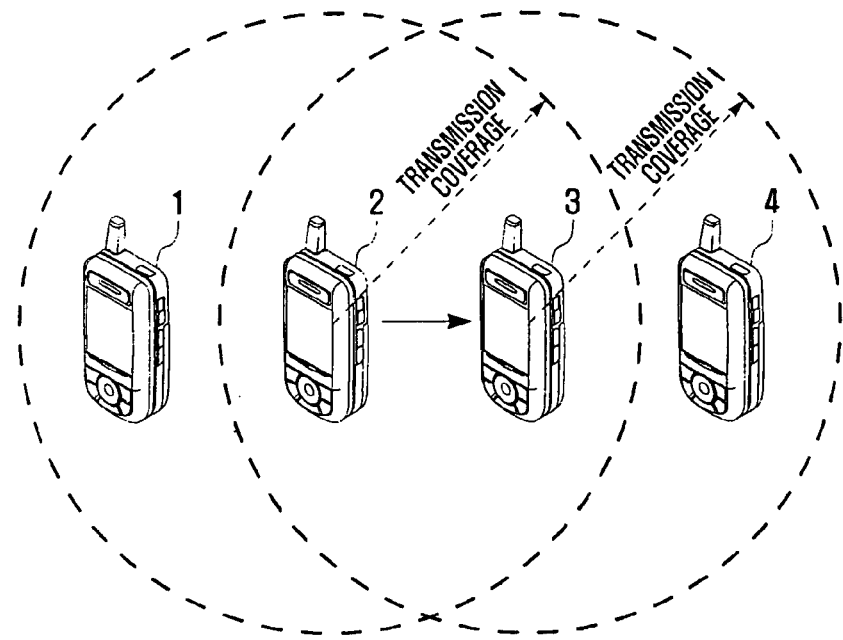
FIGS. 1A to 1C are schematic diagrams illustrating conventional CSMA/CA based wireless communication.
Figure 1B:
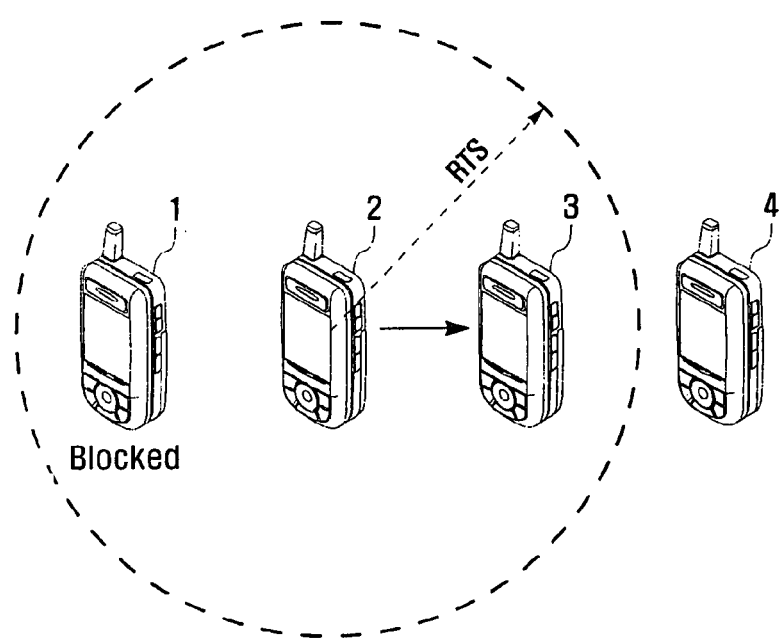
Figure 1C:
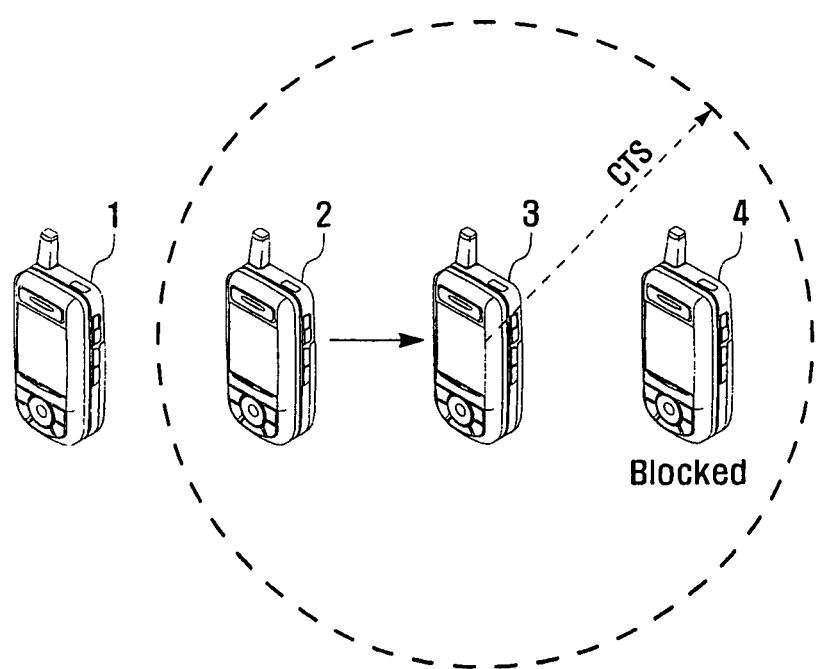

Exemplary embodiments of the present invention are described with reference to the accompanying drawings in detail. The same reference numbers are used throughout the drawings to refer to the same or like parts. For the purposes of clarity and simplicity, detailed descriptions of well-known functions and structures incorporated herein may be omitted when their inclusion could obscure appreciation of the subject matter of the present invention by a person of ordinary skill in the art.

In order assist with understanding the present invention, descriptions about some the components of the digital broadcast systems are provided. Nevertheless, a person of ordinary skill in the art that should understand and appreciate that the present invention is not limited to the examples shown and described but can be modified within the scope of the appended claims.

In the following exemplary embodiment, the communication apparatus and method of the present invention is described in operation with a heterogeneous network in which WLANs and cellular networks coexist. However, the claimed invention is not limited to such a network environment solely provided for illustrative purposes. For example, the communication apparatus and method can be implemented with an IP based packet service network, including but not limited to networks such as IEEE 802.1x and 802.2x networks. Also, the cellular networks include but are not limited to GSM, GPRS, Enhanced Data GSM Environment (EDGE), CDMA, 3rd Generation (3G) networks, and their equivalents.

In the following exemplary embodiment, the mobile terminal comprises a dual-mode mobile terminal supporting a cellular communication and an IP-based WLAN communication. However, in the claimed invention, the mobile terminal is not limited to the dual-mode terminal. For example, the communication apparatus and method can be implemented with a multi-mode mobile terminal supporting more than one WLAN technology and/or more than one cellular communication technology.

In addition, in the following exemplary embodiment, the present invention is described with a mobile terminal represented by a mobile phone supporting dual-mode communications. However, the claimed invention is not limited to mobile phones. For example, the mobile terminal may comprise a digital broadcast receiver, Personal Digital Assistant (PDA), Smartphone, cellular phone, laptop computer, palmtop computer, and the like having multiple wireless communication interfaces, just to name a few examples.

Moreover, in the following exemplary embodiment, an Access Point is implemented for utilization of all the available channels, and a Media Session configuration procedure using the Session Initiation Protocol (SIP) is introduced. SIP is a session control protocol widely used for Voice over IP, along with H.323 and other Peer-to-Peer protocols. SIP has been developed for creating, modifying and termination sessions with one or more participants.

SIP comprises an application layer control protocol that can be used with the Transmission Control Protocol (TCP) and User Datagram Protocol (UDP). SIP is a text-based protocol similar to, doe example, Hyper Text Transport Protocol (HTTP) and shares some of its design principles. A SIP message typically includes one or more header fields and an optional message body. The message body contains a description of the session encoded in some other protocol format such Session Description Protocol (SDP) and the Multipurpose Internet Mail Extensions (MIME). The systems supporting SIP controls sessions by exchanging Requests and responses.

Currently, SIP is provided for Voice over Internet Protocol (VoIP) service and Instant Message (IM) service, and developed to be used in various application fields. For example, SIP supports multimedia conference, Internet telephony, and multimedia distribution sessions in unicast and multicast relationships. SIP also supports mobility using proxy and redirect servers. SIP operates independently of underlying transport protocols such as Transport Control Protocol (TCP), User Datagram Protocol (UDP), Asynchronous Transfer Mode (ATM), and X.25, and can be extended for other application programs.

In addition, SIP follows the client/server model such that a server responds to the calls of clients. SIP elements may include a User Agent Client (UAC) and a User Agent Server (UAS).

An Instant Message Service (IMS) server typically includes a proxy server, redirect server, and registrar server. The servers may further include a location server for supporting a location service and database server. The proxy server can perform the functions of the UAC/UAS, so as to execute the call request to other servers. The proxy server is typically an intermediary entity that acts as both a server and a client for making requests on behalf of other clients. The proxy server can interpret, rewrite, translate, and rewrite specific parts of a request message before forwarding it. The proxy server may include a stateful (status) proxy server for maintaining the client and server transaction state and a stateless proxy server that does not maintain the client or server transaction status.

The redirect server typically forwards the location information received from the location server unlike the proxy server that forwards the SIP request to a mobile terminal of which location information is received from the location server. The redirect server does not accept or cancel a call, unlike the UA.

The registrar server is typically responsible for authentication so as to register the location information of the mobile terminal in cooperation with the location server and database. In addition, the location search and location information storage are performed by the location server.

The communication among the location, registrar, proxy, and redirect servers can be provided using a Lightweight Directory Access Protocol (LDAP), instead of using SIP.

In the following description, the proxy, redirect, registrar, and location servers are represented by the IMS server except when it is required to distinguish the servers from each other.

In the following exemplary embodiment, an available channel scan is performed while the media session is established through a cellular communication network according to the SIP.

Figure 2:
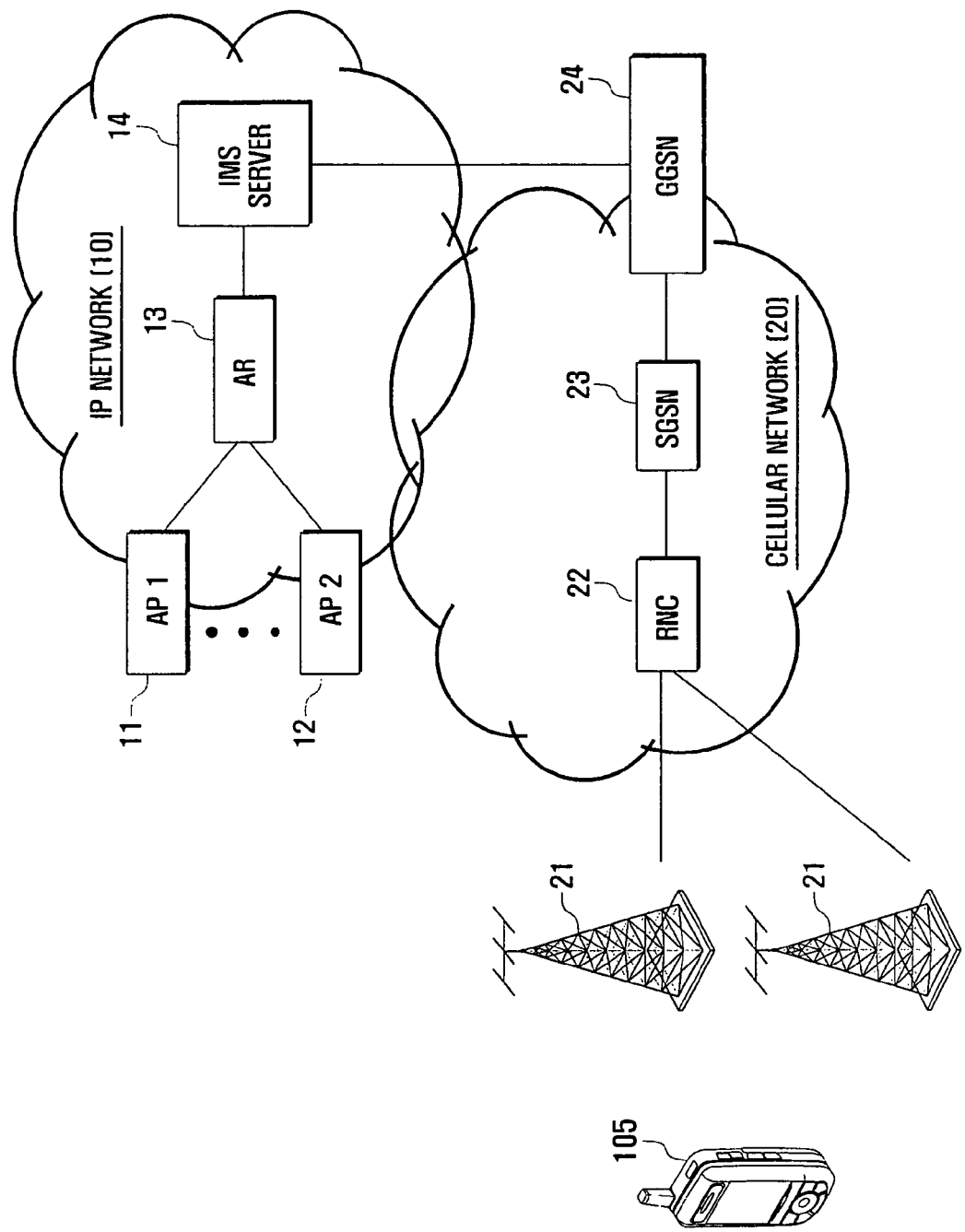
FIG. 2 is a schematic diagram illustrating a communication environment for a heterogeneous communication network according to an exemplary embodiment of the present invention.

FIG. 2 is a schematic diagram illustrating a communication environment in which heterogeneous communication network exist according to an exemplary embodiment of the present invention.

Referring to FIG. 2, an IP network 10 and cellular network 20 coexist in an overlapping area.

The IP network 10 typically includes Access Points 11 and 12, an Access Router 13, and an IMS server 14.

The cellular network 20 typically includes one or more base stations (or Node-Bs) 21, a Radio Network Controller 22, a Serving GPRS Support Node (SGSN) 23, and a Gateway CPRS Support Node (GGSN) 24. Other additional elements of the cellular network 20 are omitted in description.

A mobile terminal 1, which in this example is associated with the cellular network 20, can access the IP network 10 through the GGSN 24.

In this exemplary embodiment, the present invention is implemented with an asynchronous cellular network. However, the present invention is not limited thereto. For example, the communication apparatus and method of the present invention can be implemented with a synchronous cellular network.

Still referring to the example shown in FIG. 2, a mobile terminal 105 establishes a media session via the cellular network 20 using SIP. In order to establish a media session, the mobile terminal 1 exchanges control messages required for a media session establishment with the IMS server 14 in the IP network 10.

In this exemplary embodiment, the mobile terminal 105 can access the IP network 10 and the cellular network 20 simultaneously. That is, the mobile terminal is provided with at least two wireless communication interfaces for supporting multi mode communication.

Figure 3:
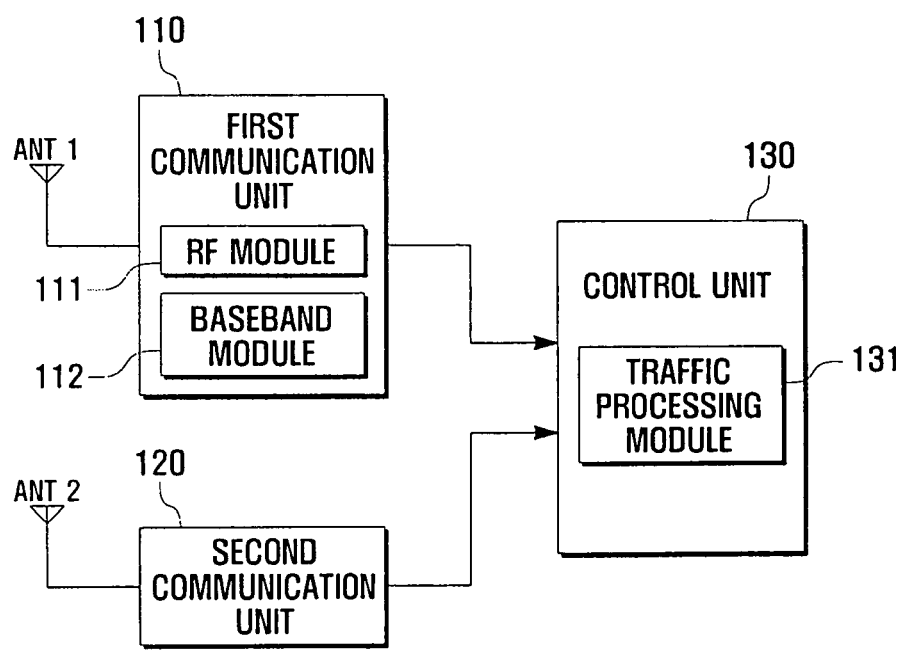
FIG. 3 is a block diagram illustrating a configuration of a dual-mode mobile terminal according to an exemplary embodiment of the present invention.

FIG. 3 is a block diagram illustrating an exemplary configuration of a dual-mode mobile terminal according to an exemplary embodiment of the present invention.

Referring to FIG. 3, the dual-mode mobile terminal includes a first communication unit 110, second communication unit 120, and control unit 130 having a traffic processing module 131.

The first control unit 110 typically includes a first radio frequency (RF) module 111 and a first baseband module 112. The first RF module includes a time RF switch, an RF filter, a low noise amplifier, and power amplifier, the RF module separating and amplifying transmission and reception signals.

The first RF module 111 may further include a frequency synthesizer for setting the frequency band in accordance with a channel number of the IEEE 802.11x (WLAN) network.

Furthermore, the first communication unit 110 can be provided with a duplexer for separately processing the inward and outward signals between the first RF module 111 and a first antenna (ANT1). The duplexer typically comprises a time division duplexer that separates the inward and outward signals in time.

The first baseband module 112 provides an interface between the first RF module 111 and the control unit 130, and performs media access control in CSMA/CA scheme and modulation/demodulation of the baseband signals.

The second communication unit 120 includes a second radio frequency (RF) module for up-converting and amplifying signals to be transmitted and an RF receiver for low-noise amplifying and down-converting the received signals. The second RF module down-converts the modulated signal into an intermediate frequency (IF) and then converts the IF signal into a radio signal to be transmitted through a first antenna (ANT2). The second RF module also up-converts the radio signal received through the second antenna (ANT2) into the IF signal and then a baseband signal.

A duplexer (not shown) can be interposed between the second RF module and the second antenna (ANT2).

The second baseband module performs channel coding and interleaving on the transmission signal and outputs the transmission signal modulated in such processes to the second RF module and performs demodulation, equalization, channel decoding, and de-interleaving on the received signal. As described above, the mobile terminal 100 is provided with the first and second communication units 110 and 120 for supporting dual communication modes.

The control unit 130 controls communication functions of the first and second communication units 110 and 120.

Particularly, the control unit 130 is provided with a traffic processing module 131. The traffic processing module 131 provides an interface between the first and second communication units, 110, 120 and the control unit 130. In other words, if the second communication unit 120 starts establishing a session, the control unit 130 controls the first communication unit 110 to scan for available channels of an Access Point (AP). More particularly, the traffic processing module 131 generates a control signal for controlling the first and second communication units 110 and 120 to perform the session establishment and available channel scan, simultaneously.

Still referring to FIG. 3, the mobile terminal (such as terminal 105, shown in FIG. 2) includes a memory and/or other type of storage medium for storing user data and application programs. The mobile terminal 105 may further include at least one of an input unit for generating sequence in response to a user input, a slot enabling of attaching an external storage medium, a broadcast receiver module, a camera module, a connection port enabling data communication with an external device, a power supply port, and other supplementary modules (all not shown). In addition, the mobile terminal can be implemented with other supplementary function modules that are not listed in the exemplary description. However, a person of ordinary skill in the art should understand and appreciate that the mobile terminal can incorporate various supplementary functions in consideration of the tendency of functionality convergence.

Still referring to FIG. 3, the control unit 130 acts as a central processing unit for controlling the cooperation of the units and modules constituting the mobile terminal.

The operation of the first communication unit 110 of the above-structured mobile terminal is described hereinafter in more detail.

The control unit 130 may configure a frequency bandwidth according to a channel number of the IEEE 802.11x standard. The control unit 130 can, for example, select 12 channels in the IEEE 802.11a and 3 channels in the IEEE 802.11b.

The control unit 130 can generate and output a channel configuration signal to the first baseband module 112 for configuring the frequency bandwidth. The first baseband module 112 converts the channel configuration signal to be suitable for the frequency synthesizer of the first RF module 111. The converted channel configuration signal is transmitted to the first RF module 111 such that the synthesizer is configured on the basis of the channel configuration signal. Accordingly, the frequency output by the frequency synthesizer is mixed by the frequency output by the local oscillator (LO) at a frequency mixer such that frequency channel of the first communication unit 110 is configured.

A session establishment process of the exemplary mobile terminal 105 is described hereinafter. A session establishment is a process for preparing communication between two terminals, which are typically two mobile terminals. Before establishing a session, the two terminals should register their locations to the IMS server 14.

In order for the mobile terminal 105 to register its location, the mobile terminal 105 transmits a registration request message to a registrar server.

Table 1 shows a format of a registration request message.

TABLE 1

| Field | Content |
| --- | --- |
| REGISTER | sip: samsung.com SIP/2.0 |
| From | sip: jmc@samsung.com |
| To | sip: jmc@samsung.com |
| Contact | <sip: 165.213.90.203 |
| Expires | 3600 |

As shown in Table 1, the registration request message is comprised of a REGISTER, From, To, Contact fields. The "From" field contains a source address, the "To" field contains a destination address, and the "Contact" field contains a location of the mobile terminal.

Figure 4:
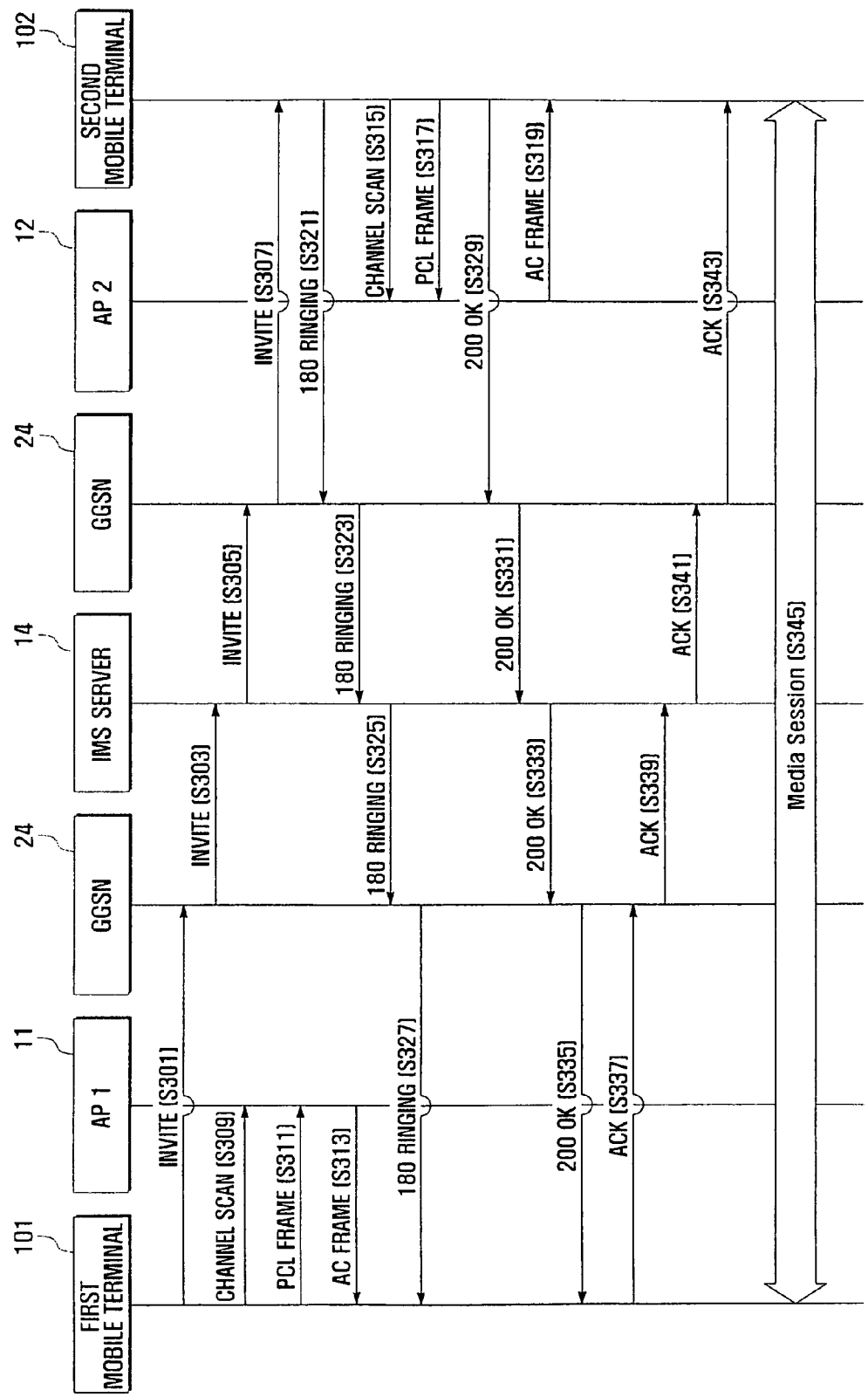
FIG. 4 is a message flow diagram illustrating a communication method according to an exemplary embodiment of the present invention.

FIG. 4 is a message flow diagram illustrating a communication method according to an exemplary embodiment of the present invention that can be used in conjunction with the exemplary configuration shown in FIG. 3.

If a registration request is received, the registrar server (typically represented by the designation "IMS" server, as previously noted) registers the location of the mobile terminal and transmits a 200 OK response to the mobile terminal. The 200 OK response is an acknowledge message for reporting successful reception of the registration request message.

The mobile terminal according to the present invention typically comprises a dual-mode mobile phone equipped with the first communication unit 110 responsible for IP-based WLAN communication with the IP network 10 and the second communication unit 120 responsible for cellular communication with the cellular network. The first communication unit 110 enables the mobile terminal 100 to access the IMS server 14 through the APs 11 and 12 and AR 13, and the second communication 120 enables the mobile terminal 100 to access the IMS server 14 through the RNC 22, SGSN 23, and GGSN.

In FIG. 4, it is assumed that a first mobile terminal 101 is located in a radio coverage of a first AP 11 and a second mobile terminal 102 is located in a radio coverage of a second AP 12. A media session is triggered by the first mobile terminal 101.

Still referring to the example shown in FIG. 4, the first mobile terminal 101 transmits an INVITE message to the IMS server 14 via the GGSN 24 (S301 and S303) of the cellular network 20.

Upon receiving the INVITE message, the IMS server 14 forwards the INVITE message to the second mobile terminal 103 via the GGSN 24 (S305 and S305).

At this time, the first mobile terminal 101 transmits the INVITE message through the second communication unit 120. The INVITE message contains the source and destination addresses.

After transmitting the INVITE message, the first mobile terminal 101 performs a channel scan for retrieving available channels of the first AP 11 (S309). That is, if an INVITE message transmission is detected, the control unit 130 of the mobile terminal 101 controls the first communication unit to scan for searching the available channels of the first AP 11.

In this exemplary embodiment, it is assumed that channels 1 to 4 are retrieved as the available channels.

If the channels 1 to 4 are retrieved as the available channels, the first mobile terminal 101 generates a Preferred Channel List (PCL) of the first AP 11 that lists the retrieved channel numbers.

After the channel scanning is completed, the first mobile terminal 101 generates a PCL frame and transmits the PCL frame to the first AP 11 (S311).

If a PCL frame is received, the first AP 11 compares the channel numbers indicated by the PCL frame and channel numbers listed in its own PCL so as to assign the most available channel on the basis of the comparison result. In this exemplary embodiment, it is assumed that channel 2 is determined as the most available channel. The most available channel is called an accepted channel (AC).

If an AC is determined, the first AP 11 generates an AC frame and transmits the AC frame to the first mobile terminal 101 (S313). The first mobile terminal 101 is set with the channel indicated by the AC frame. That is, the first mobile 101 sets the communication channel 2 for IP communication.

Upon receiving the INVITE message, the second mobile terminal 102 performs channel scan to detect available channels (S315). That is, the control unit 130 of the second mobile terminal 102 controls the first communication unit 110 to scan channels of the second AP 12 along with the session initiation.

In this exemplary embodiment, it is assumed that channels 5 to 9 are detected as available. The second mobile terminal 102 generates a PCL frame with the available channels of the second AP 12 and transmits the PCL frame to the second AP 12 (S317).

If the PCL frame is received, the second AP 12 compares the PCL indicated by the PCL frame and its own list and assigns one of the available channels as the AC. In this exemplary embodiment, the channel 9 is assigned as the AC.

After determining the AC, the second AP 12 transmits the AC frame to the second mobile terminal 102 (S319) such that the mobile terminal 102 sets the channel 9 for IP communication.

As described above, each of the first and second mobile terminals (101 and 102) uses all the available channels of the AP through channel scan, PCL frame and AC frame exchange processes. For example, 12 channels can be selected in the IEEE 802.11a and 3 channels in IEEE 802.11b.

During the channel assignment procedure (S309 to S319), the first and second mobile terminal performs establishment of a session.

If the INVITE message is received, the second mobile terminal 102 transmits a 180 RINGING message to the IMS server 14 through the GGSN 23 of the cellular network 20 (S321 and S323). The IMS server 14 forwards the 180 RINGING message to the first mobile terminal 101 through the GGSN 24 of the cellular network 20 (S325 and S327).

Next, the second mobile terminal 102 transmits the 200 OK message to the IMS server 14 through the GGSN 24 of the cellular network 20 S329 and S331). Upon receiving the 200 OK message, the IMS server 14 forwards the 200 OK message to the first mobile terminal 101 through the GGSN 24 of the cellular network 20 (S333 and S335).

If the 200 OK message is received, the first mobile terminal 101 transmits an acknowledge (ACK) message to the IMS server 14 through the GGSN 24 of the cellular network 20 (S337 and S339). The IMS server 14 forwards the ACK message to the second mobile terminal 102 through the GGSN 24 of the cellular network 20 (S341 and S343).

Through the above-described procedure a media session is finally established between the first and second mobile terminals 101 and 102. The media session is established via the first AP 11 and IMS server 14.

After the media session is established, the first and second mobile terminals 102 can communicate through the IP network 10. In this exemplary embodiment, the first mobile terminal 101 is associated with the first AP through channel 2, and the second mobile terminal 102 is associated with the second AP through channel 9.

The above-explained communication method is described hereinafter in view of the mobile terminal.

Figure 5:
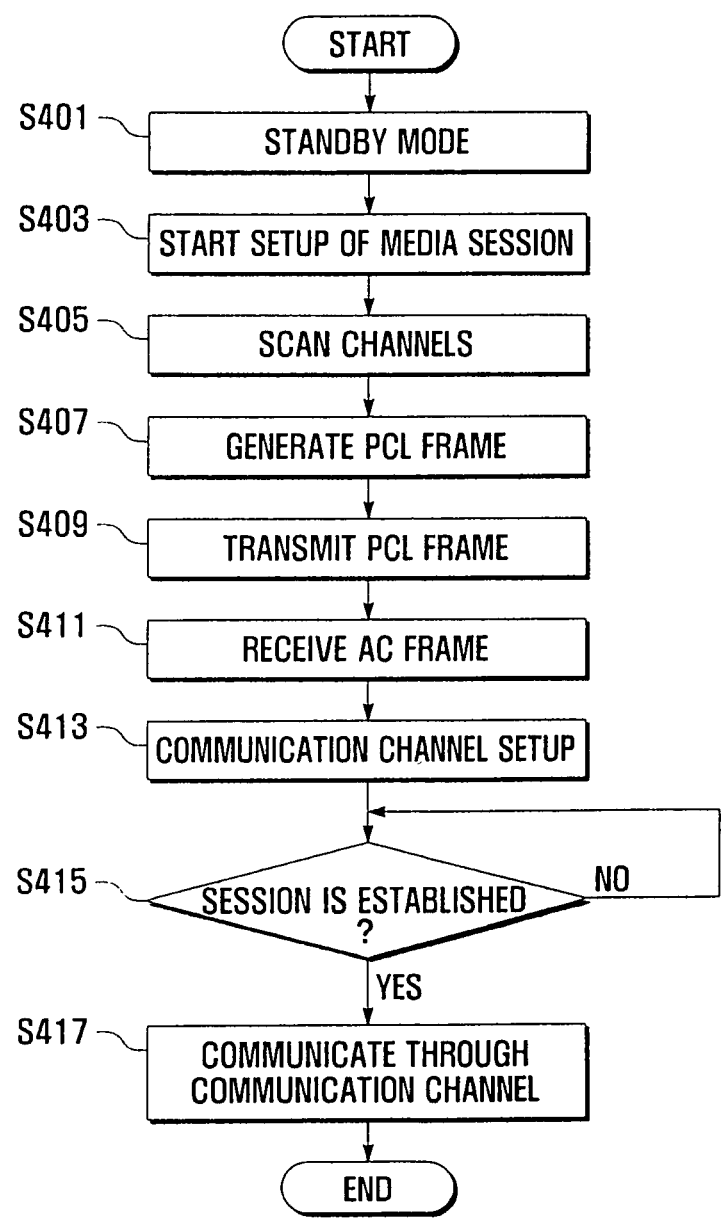
FIG. 5 is a flowchart illustrating a communication method for a dual-mode mobile terminal according to an exemplary embodiment of the present invention.

FIG. 5 is a flowchart illustrating a communication method for a dual mode mobile terminal according to an exemplary embodiment of the present invention.

Referring to FIG. 5, the control unit 130 of a mobile terminal recognizes that the mobile terminal is in a standby mode (S401). If a media session is requested in the standby mode, the control unit 130 controls the second communication unit 120 to start setting up a media session (S403) and controls the first communication unit 110 to scan the channels of an AP (S405).

In the case of the sending portion of the communication, the mobile terminal starts setting up a session by transmitting the INVITE message. In the case of the recipient portion of the communication, the mobile terminal starts setting up a session by receiving the INVITE message. The INVITE message is transmitted and received through the second communication unit 120. If it is detected that an INVITE message is transmitted or received, the traffic processing module 131 of the control unit 130 issues a traffic indicator to the first communication unit 110 such that the first communication unit 110 starts scanning for detecting available channels of the AP.

The traffic indicator informs that a session is started and instructs to start available channel detection. The available channel means the resources that are not assigned by the AP.

After completing the channel scanning, the control unit 130 generates a PCL frame on the basis of the channel scan result (S407) and transmits the PCL frame to the AP (S409). The PCL lists the detected available channels. The recipient party mobile terminal transmits an AC frame in response to the PCL frame. The AC frame contains a channel number selected among the channels indicated by the PCL frame.

The mobile terminal receives the AC frame in response to the PCL frame (S411) and sets up a communication channel according to the channel number indicated by the AC frame (S413).

In order to set up the communication channel, the control unit 130 (shown in FIG. 3) generates a channel setup control signal. The channel setup control signal is transferred to the first baseband module 112 of the first communication unit 110 such that the first baseband module 112 converts the channel setup control signal into a signal suitable for adjusting the frequency synthesizer of the first RF module 111. Accordingly, the synthesizer adjusts the frequency of the local oscillator (LO) output to a mixer of the first RF module 111 such that a required frequency of the first RF module 111 is obtained.

After setting up the communication channel, the control unit determines whether the media session is established at the second communication unit 120 (S415)

The media session is established as explained with below with reference to FIG. 4. That is, the session is established by exchanging the INVITE message, 180 RINGING message, 200 OK message, and ACK message between the sending party mobile terminal and the recipient party mobile terminal.

Now referring again to FIG. 5, if it is detected that the media session is established (S415), then at (S417) the two mobile terminals transmit and receive the data through the channels set up at step 413.

Although exemplary embodiments of the present invention have been described in detail hereinabove, it should be clearly understood to a person of ordinary skill in the art that many variations and/or modifications of the basic inventive concepts herein taught may be made and will fall within the spirit of the present invention and the scope of the appended claims.

As described above, the communication apparatus and method of a dual-mode mobile terminal according to the present invention enables one communication module retrieves an available communication channel while the other communication module sets up a session, resulting in effective resource management and fast session establishment.

What is claimed is:

1. A communication apparatus for dual-mode mobile terminal, comprising:
    a first communication unit configured to support a communication with a wireless local area network including an Access Point and an Instant Message Service (IMS) server;
    a second communication unit configured to support a communication with a cellular network accessible to the IMS server in the wireless local area network; and
    a control unit configured to simultaneously control both the second communication unit to access the IMS server through the cellular network and to set up a media session with a first terminal via the IMS server, and the first communication unit to scan, when the second communication unit starts to set up the media session, available channels of the Access Point for communicating with a second terminal, to generate a preferred channel list (PCL) while the media session is being established with the first terminal through the cellular network, to transmit the generated PCL to the Access Point, and to retrieve a preferred channel among scanned available channels listed in the PCL, the preferred channel being selected by the Access Point in the wireless local area network and configured to subsequently control the first communication unit to communicate with the second terminal through the preferred channel when the media session is established with the first terminal.

2. The communication apparatus of claim 1, wherein the preferred channel comprises a communication channel for communication with the second terminal after the media session is established.

3. The communication apparatus of claim 2, wherein the first communication unit includes means for transmitting to the Access Point the preferred channel list comprising a listing of the scanned available channel numbers under the control of the control unit.

4. The communication apparatus of claim 3, wherein the control unit is configured to assign one of the available channel numbers listed in the preferred channel list as a preferred channel number.

5. The communication apparatus of claim 4, wherein the preferred channel is assigned by the Access Point.

6. The communication apparatus of claim 2, wherein the media session is set up in accordance with a Session Initiation Protocol (SIP).

7. The communication apparatus of claim 1, wherein the control unit comprises a traffic processing module for providing an interface between the first communication unit and the second communication unit.

8. The communication apparatus of claim 1, wherein the first communication unit comprises an RF module for setting a frequency band in accordance with a channel of the wireless local area network.

9. The communication apparatus of claim 8, wherein the first communication unit further comprises a baseband module for providing an interface between the RF module and the control unit, and for performing media access control in a Carrier Sensing Multiple Access with Collision Avoidance (CSMA/CA) scheme and modulation/demodulation of baseband signals.

10. The communication apparatus of claim 9, wherein the baseband module converts a channel configuration signal for transmission to the RF module.

11. A communication method for a dual-mode mobile terminal having a first communication unit for supporting a communication with a wireless local area network including an Access Point and an Instant Message Service (IMS) server and a second communication unit for supporting a communication with a cellular network, the method comprising:
   simultaneously accessing the IMS server through the cellular network and establishing a media session with a first terminal via the IMS server using the second communication unit;
   scanning, when the second communication unit starts to set up the media session, available channels of the Access Point for communicating with a second terminal;
   generating a preferred channel list (PCL) while the media session is being established with the first terminal through the cellular network using the first communication unit;
   transmitting the generated PCL to the Access Point using the first communication unit;
   retrieving a preferred channel selected among scanned available channels listed in the PCL by the Access Point in the wireless local area network using the first communication unit; and
   subsequently communicating, when the media session is established with the first terminal, by way of the first communication unit with the second terminal through the preferred channel.

12. The communication method of claim 11, wherein retrieving the preferred channel from the PCL comprises:
   generating the preferred channel list comprising channels available with the Access Point;
   transmitting by the dual-mode terminal the preferred channel list to the Access Point; and
   receiving a channel number indicating one of the channels listed in the preferred channel list from the Access Point after the Access Point compares the channel list transmitted by the dual-mode terminal.

13. The communication method of claim 12, wherein the preferred channel list indicates channels that are not yet assigned by the Access Point.

14. The communication method of claim 12, wherein the preferred channel is selected by the Access Point.

15. The communication method of claim 11, wherein the media session is established in accordance with a Session Initiation Protocol (SIP).

16. The communication method of claim 15, wherein the media session is established by exchanging SIP messages through the cellular network.

17. The communication method of claim 11, wherein the media session is established between the dual-mode terminal and the second terminal via the Access Point and an IMS server.

18. The communication method of claim 17, wherein the media session is established by the session is established by exchanging an INVITE message, a RINGING message, an OK message, and an ACK message between the dual-mode mobile terminal and the first mobile terminal.

19. The communication method according to claim 11, wherein the media session is established by the dual-mode mobile terminal transmitting a registration request to a registrar server.

20. The communication method according to claim 17, wherein the IMS server further comprises at least one of a proxy server and a redirect server.

* * * * *

UNITED STATES PATENT AND TRADEMARK OFFICE
CERTIFICATE OF CORRECTION

PATENT NO.        : 8,892,098 B2  
APPLICATION NO.   : 11/952163  
DATED             : November 18, 2014  
INVENTOR(S)       : Jong Mu Choi Page 1 of 1

It is certified that error appears in the above-identified patent and that said Letters Patent is hereby corrected as shown below:

IN THE CLAIMS:

Column 12, Claim 18, Lines 31-32 should read as follows:  
--…media session is established by exchanging…--

Signed and Sealed this  
Third Day of March, 2015

Michelle K. Lee  
*Deputy Director of the United States Patent and Trademark Office*